Feb. 15, 1949.  T. HARRIS ET AL  2,461,641
MEANS FOR CONVERTING ROTARY TO INTERMITTENT
OSCILLATING MOTION
Filed March 26, 1947  2 Sheets-Sheet 1
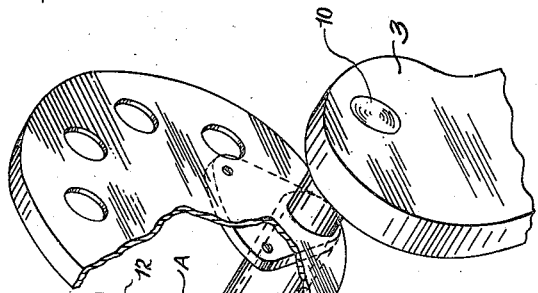
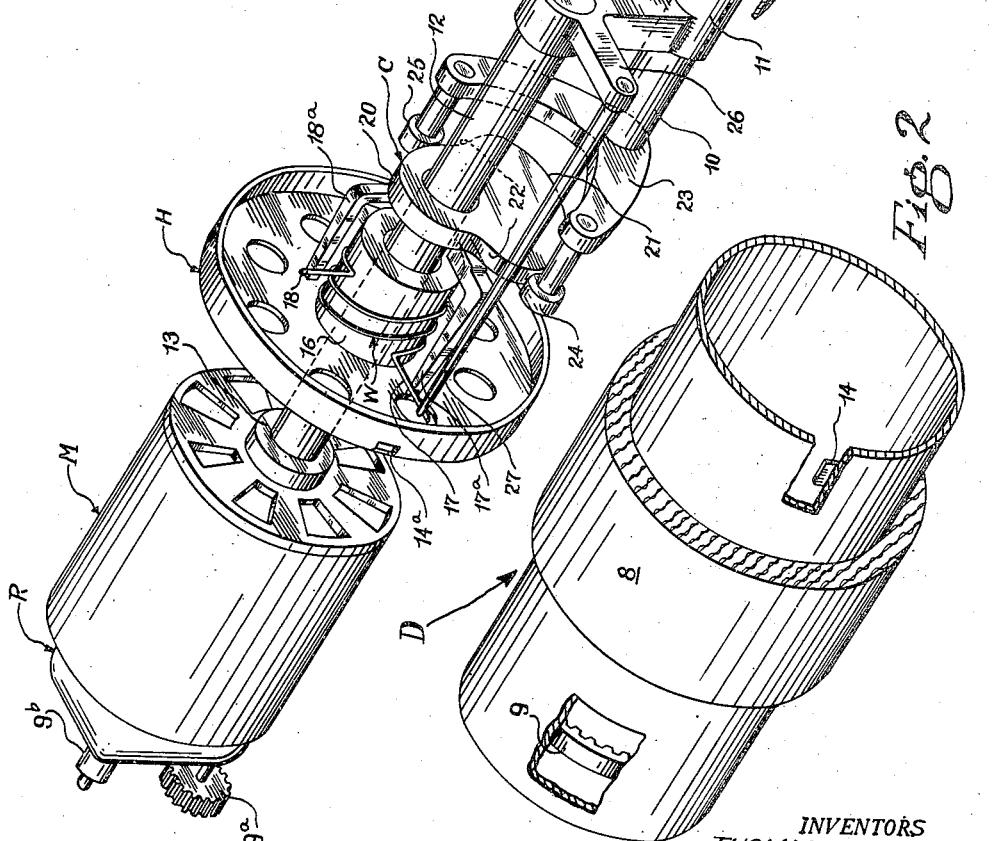
INVENTORS
THOMAS HARRIS AND
EDWARD C. SWILIK
BY
Richey + Watts
ATTORNEYS

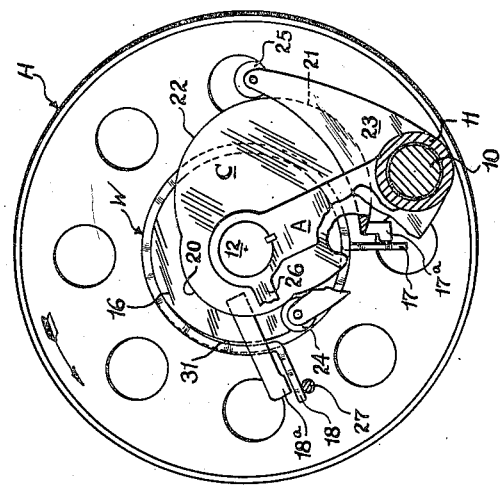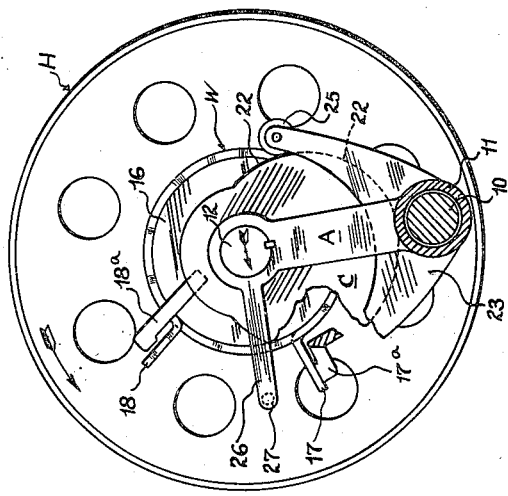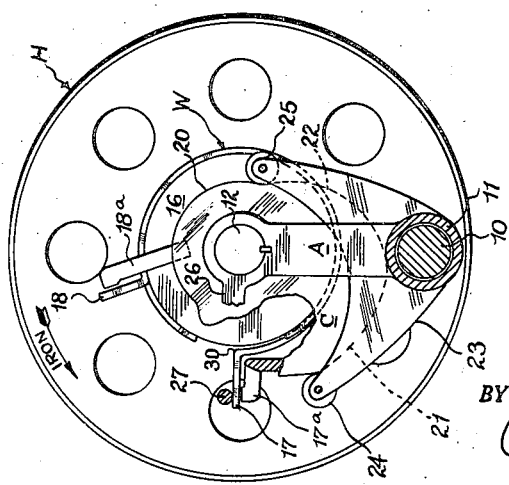

Patented Feb. 15, 1949

2,461,641

UNITED STATES PATENT OFFICE 2,461,641

MEANS FOR CONVERTING ROTARY TO INTERMITTENT OSCILLATING MOTION

Thomas Harris, East Cleveland, and Edward C. Swilik, Cleveland, Ohio, assignors, by direct and mesne assignments, to The Apex Electrical Manufacturing Co., Cleveland, Ohio, a corporation of Ohio Application March 26, 1947, Serial No. 737,212

9 Claims. (Cl. 74—89)

This invention relates to machine elements, more particularly to a machine element for converting continuous rotary motion of a reversible driving member in a given direction to intermittent unidirectional motion of a driven member in a given direction about an axis displaced from that of the driving member, the direction of the driven member depending upon the direction of the driver.

It is an object of this invention to provide a mechanism wherein the driving member, a clutch member and a driven member are all mounted for rotation about one axis, said mounting means and members being mounted for oscillation about a spaced parallel axis, the driven member being arranged to cooperate with a normally stationary reaction member to effect said oscillation. In carrying out these objects of our invention we make use of a simple intermittent clutch which automatically engages and disengages the clutch taking the form of a spring wire or equivalent structure which is wrapped around a drum or shaft in the general form of a helix and which has projecting arms attached to or integral with the wire. Such a wire has a tendency to tightly grip the drum which supports it when one of the arms is forced in a direction tending to wrap the wire around the drum. We make an intermittent or partial revolution clutch from this arrangement by having the wire cooperate with arms carried by the associated driving or driven member, the arrangement being such that when the arms engage the wire tends to wrap around the drum, clutch the parts together and initiate oscillation of the members.

The type of clutch that we employ also has a simple arrangement for releasing the oscillation drive which involves interposing an arm or pin in the path of the free spring arm, so that when the spring arm is carried against the pin the spring is unwrapped from the hub and driving action and hence oscillation of the members thereby ceases.

In order to disclose one application wherein our novel oscillation drive is useful, we have illustrated and described the basic parts of an automatic ironer in which our oscillating mechanism may be employed. This arrangement enables the motor to move an ironing drum toward an ironing shoe and to withdraw it therefrom without requiring manually controlled clutches to effect this function. Accordingly, in the following description our novel oscillating drive arrangement will be described together with brief description of an associated ironing device which represents one reduction to practice of the invention.

In the drawings:

Fig. 1 is a perspective diagrammatic view of an ironing device embodying the clutch of this invention;

Fig. 2 is a partial view of an ironing drum showing how it is driven in this sample application; and Figs. 3, 4 and 5 are end elevations which illustrate how the clutch operates in the ironer and which are illustrative of the basic operation of the clutch in any device.

In Fig. 1 an ironing drum support member 3 has mounted therein a support shaft 10 and this shaft, in turn, supports sleeve 11 which is fixed to an arm A mounted for independent rotation upon the shaft 10. An oscillating support arm or bar 12 is keyed to the arm A, this arm forming a support for the motor M and also representing the center of rotation of the drum. The frame or housing of motor M is mounted on bar 12 by any convenient means indicated generally at 13 and the motor is also provided with a gear reduction R so that the pinion 9a may be driven at the required relatively slow speed.

In Fig. 2 part of the drum D is shown; it carries a fabric cover 8, a fragmentary portion of which is illustrated. There is also an internal ring gear 9 which is driven by a pinion 9a shown in Fig. 1. A part of the drum is also broken away in Fig. 2 to show a key 14 which drives a hub member H in the operating mechanism as will be described presently. The free end of the drum is rotatably supported on stub shaft 9b.

Forward of the motor a hub driving member H is mounted for independent rotation upon the oscillatory supporting bar 12. Member H is driven by the key 14 on the drum, which key engages a recess or slot 14a in the periphery of the hub member H. Member H drives the clutch hub 16 which forms the driving element of the clutch in this application.

The clutch member is a helical wire element W wrapped around the hub 16 so that it has a frictional engagement with the hub. The ends of the wire W may be bent outwardly as at 17 and 18 to form driving and actuating arms. The wire W is preferably made of spring steel of high tensile strength. A cam member C in this application represents the driven member of the clutch assembly, the general action being that the spring wire W clutches together hub member H and the cam C. Cam C has a pair of arms 17a and 18a attached thereto or integral therewith for coaction with the extension arms 17 and 18 of the clutch spring W.

In order to position the ironing drum, cam C is formed with circular portions 20 and 21 the centers of which coincide with the center of the shaft or bar 12. The cam is also formed with lift edges 22 joining the two edges 20 and 21, the edges 22 lying in a circle the center of which lies below that of arm 12. A cam follower arm member 23 is mounted to turn with the support shaft 10 and has cam follower rollers 24 and 25. As will be explained presently, it is the action of cam C against the cam rollers 24 and 25 which causes the arm A and hence the drum to move to and from the ironing shoe.

In order that the clutch W may be disengaged at proper times in the cycle, the arm A carries a bracket 26 which mounts a clutch release pin 27, the pin being positioned in the path of motion of one or the other of the spring arms 17 or 18, depending upon the direction of rotation of the hub member H.

In Fig. 3, an elevation view of the member H, the cam, the wire clutch W and the cam follower arm and drum support arm A are shown. The mechanism shown in Fig. 3 is drawn in the fully retracted position, that is, with the drum withdrawn from the shoe. As indicated by the arrow, the direction in which the drum rotates in order to iron is assumed to be counterclockwise. Now, as the motor is started in a forward direction, since the spring clutch wire W has a frictional engagement with the hub 16, rotation of the member H carries the spring W with it, and the arm 18 on the spring member W tends to be carried away from the arm 18a on the cam C. The arm 17, which had formerly been pressed against the release pin 27 so that the wire was slightly spaced or unwrapped from the hub 16, as at 30, will now be turned away from the release pin. As the hub member 16 carries the wire W and the arm 17 away from the release pin 27, the end of the wire adjacent arm 17 is permitted to spring back against the hub and remove the clearance shown at 30. When this occurs the parts are so related that the arm 17 is carried against the cam arm 17a. With the clutch arrangement of the sort shown here, this immediately causes the wire W to be wrapped around and firmly clamped to the hub 16. The wire W now tends to move with the hub 16 and hence with the member H. Since the arm 17 of the clutch wire is now locked to the hub member H, it will carry the arm 17a, and hence the cam C, along with it. The cam C is mounted for independent rotation on the supporting shaft 12 and it will be noted that a lift portion 22 of the cam will be moved under the roller 25 which roller is fixed to the stationary support shaft 10.

The support shaft 10 is stationary and the roller support arm 23 cannot turn. However, it will be noted that arm A is free to turn on shaft 10 as can be seen in Figs. 1 and 3. Therefore, as the cam C is rotated by the clutch, the lift portion 22 reacts against the roller 25 and forces the entire drum supporting mechanism to the left in the figure so that arm A pivots upon shaft 10.

The forward cycle is shown partially completed in Fig. 4. It will be noted that the arm A has been forced to the left, or towards the shoe, and that the lift portion 22 of the cam is continuing to react against the fixed roller 25. It will be noted in Fig. 4 that the arm 17 is driving the cam arm 17a and that all clearance is taken up between the clutch wire and the hub and this action tends to wrap the wire around the hub and to increase the driving action of the clutch.

In Fig. 5, the forward cycle is completed. The action just shown in Fig. 4 continues until the arm 18 of the wire W is carried against the release pin 27 which, as can be seen in Fig. 2, is mounted on the arm A. When this happens the adjacent end of the wire W is lifted from the hub 16 and the force of the pin 27 against the spring arm 18 tends to unwrap wire from the hub 16 providing a clearance as at 31. Thus, the wire W no longer tends to be driven by the hub 16, and arm 17 of the wire will no longer tend to rotate the cam C by means of cam arm 17a. At this time, the clutch has automatically disengaged and member H and hence the drum turn free.

When the operator desires to have the drum withdrawn from the shoe, he merely reverses the motor. When the motor reverses, the arm 18 of the spring W is carried away from the release pin 27 and towards the cam arm 18a, and when the arm 18 engages the cam arm 18a, the spring is again wrapped around the hub 16 and further reverse rotation of the motor, hub and clutch spring W drives the cam C in a clockwise direction. Now, the portion of the cam 22 which engages roller 24 acts as a lift portion of the cam and since the roller 24 is stationary, the shaft 12 and the entire assembly is moved back towards its original position. When the initial position is reached, the arm 17 is brought up against pin 27 which partially unwraps and releases the clutch and the clutch is again disengaged.

Having completed the description of one mechanism in which our novel interrupted oscillatory mechanism may be employed, those skilled in the art will appreciate that we have provided a simple and effective device which cannot get out of adjustment and which should be dependable at all times. Although we have illustrated our drive for use in an ironing machine, we contemplate that it may have other applications where a partial or interrupted oscillatory drive is to be employed in connection with a reversible mechanism. It will be understood that the spacing of the clutch arms may be varied depending upon the amount of rotation desired when the elements are clutched together. Likewise, the location of the release pin determines the position of the limits of oscillation of the device.

We contemplate that forms of cam or reaction members other than a disc cam member may be employed to carry out the principles of our invention.

These and other modifications in the nature of mere design details may be made without departing from the spirit of the invention as defined in the appended claims.

What is claimed is:

1. An intermittent oscillating mechanism comprising reversible driving and driven members, a clutch associated with said members, support means for said mechanism movable in alternate directions about an axis spaced from that of said members, means associated with said driven member for effecting said motion when the clutch engages, and a release member for disengaging the clutch after a predetermined angular motion of said support in either direction.

2. An intermittent oscillating mechanism comprising reversible driving and driven members, a clutch associated with said members, support means for said mechanism movable in alternate directions about an axis spaced from that of said members, action means associated with said driven member engaging relatively stationary reaction means, said action means being formed to effect said motion when the clutch engages, and a release member for disengaging the clutch after a predetermined angular motion of said support in either direction.

3. An intermittent oscillating mechanism comprising reversible driving and driven members, a clutch associated with said members, support means for said mechanism movable in alternate directions about an axis spaced from that of said members, cam means associated with said driven member engaging relatively stationary follower means, said cam means being formed to effect motion of said support means, means causing clutch engagement when the driving member is started in either direction, and a release member for disengaging the clutch after a predetermined angular motion of said driving member in the direction in which it was started.

4. An intermittent oscillating mechanism comprising a first support, a second support spaced therefrom and supported thereby, said second support being mounted for motion in alternate directions relative to said first support, mechanism including reversible driving and driven members mounted for rotation on said second support, a clutch for coupling said members, action means on said driven member for engaging relatively stationary reaction means, said action means being formed to move said second support and mechanism relative to said first support in a direction that depends upon the direction of rotation of the driving member, operator means carried by one of said members for causing engagement of said friction clutch when the driving member turns in either direction and release means engaged by said clutch operative to disengage the clutch after it has turned a predetermined amount in the direction in which it started.

5. An intermittent oscillating mechanism comprising a first support, a second support spaced therefrom and supported thereby, said second support being mounted for motion in alternate directions relative to said first support, mechanism including reversible driving and driven members mounted for rotation on said second support, a clutch for coupling said members, action means on said driven member for engaging relatively stationary reaction means, said action means being formed to move said second support and mechanism relative to said first support in a direction that depends upon the direction of rotation of the driving member, a pair of spaced clutch actuating members carried by said clutch, operator means carried by one of said members for engaging one of said actuating members and causing engagement of said friction clutch when the driving member turns in either direction, and release means positioned to be engaged by the other of said actuating members of said clutch to disengage the clutch after it has turned in the direction in which it started an amount substantially equal to the spacing of said clutch actuating members.

6. An intermittent oscillating mechanism comprising a first support, a second support spaced therefrom and supported thereby, said second support being mounted for motion in alternate directions relative to said first support, mechanism including reversible driving and driven members mounted for rotation on said second support, a clutch for coupling said members, cam means on said driven member associated with relatively stationary follower means, said cam means being formed to move said second support and mechanism relative to said first support in either direction depending upon the direction of rotation of the driving member, operator means carried by one of said members for causing engagement of said friction clutch when the driving member turns in either direction and release means engaged by said clutch operative to disengage the clutch after it has turned a predetermined amount in the direction in which it started.

7. An intermittent oscillating mechanism comprising a first support, a second support spaced therefrom and supported thereby, said second support being mounted for motion in alternate directions relative to said first support, mechanism including reversible driving and driven members mounted for rotation on said second support, a clutch for coupling said members, cam means on said driven member for engaging relatively stationary follower means, said cam means being formed to move said second support and mechanism relative to said first support in either direction that depending upon the direction of rotation of the driving member, a pair of spaced clutch actuating members carried by said clutch, operator means carried by one of said members for engaging one of said actuating members and causing engagement of said friction clutch when the driving member turns in either direction, and release means positioned to be engaged by the other of said actuating members of said clutch to disengage the clutch after it has turned in the direction in which it started an amount substantially equal to the spacing of said clutch actuating members.

8. Intermittent oscillating mechanism comprising base structure, an element movably mounted on said base, said mechanism including a reversible rotatable driving member and a rotatable driven member, action means connected for rotation by said driven member and having a connection with said movably mounted element, normally stationary reaction means supported by said base structure and in engagement with said action means, motion of said driven member in alternate directions causing action and reaction between said means to produce oscillating movement of said movably mounted element relative to said base, a clutch for coupling said driving and driven members, clutch engaging means operable to engage said clutch and couple said members when said driven member is turned in one direction with said movably mounted element in one position relative to said base, clutch engaging means operable to engage said clutch and couple said members when said driven member is turned in the other direction with said movably mounted element in another position, and clutch release means arranged to automatically disengage said clutch after a predetermined rotation of said driven member in either direction.

9. Intermittent oscillating mechanism comprising base structure, an element pivotally mounted on said base, said mechanism including a reversible rotatable driving member and a rotatable driven member mounted for rotation about an axis spaced from said pivot axis, action means connected for rotation by said driven member and having a connection with said pivotally mounted element, normally stationary reaction means supported by said base structure and in engagement with said action means, motion of said driven member in alternate directions causing action and reaction between said means to produce oscillation of said pivotally mounted element, a clutch for coupling said driving and driven members, clutch engaging means operable to engage said clutch and couple said members when said driven member is turned in one direction with said pivotally mounted element in one position relative to said base, clutch engaging means operable to engage said clutch and couple said members when said driven member is turned in the other direction with said pivotally mounted element in another position, and clutch release means arranged to automatically disengage said clutch after a predetermined rotation of said driven member in either direction.

THOMAS HARRIS.
EDWARD C. SWILIK.

No references cited.